US008891930B2

(12) United States Patent
Anguiano et al.

(10) Patent No.: US 8,891,930 B2
(45) Date of Patent: Nov. 18, 2014

(54) FIBER MANAGEMENT FRAMES HAVING MODULAR TRAY HOLDER

(71) Applicant: Corning Cable Systems LLC, Hickory, NC (US)

(72) Inventors: Salvador Anguiano, Fort Worth, NC (US); Jason Cameron Payne, Fort Worth, TX (US); Karyne Poissant Prevratil, Fort Worth, TX (US); John Joseph Stillwell, Hickory, NC (US)

(73) Assignee: Coring Cable Systems LLC, Hickory, NC (US)

( * ) Notice: Subject to any disclaimer, the term of this patent is extended or adjusted under 35 U.S.C. 154(b) by 0 days.

(21) Appl. No.: 13/905,576

(22) Filed: May 30, 2013

(65) Prior Publication Data

US 2014/0044400 A1 Feb. 13, 2014

Related U.S. Application Data

(60) Provisional application No. 61/681,908, filed on Aug. 10, 2012.

(51) Int. Cl.
 *G02B 6/00* (2006.01)
 *G02B 6/44* (2006.01)
(52) U.S. Cl.
 CPC ............ *G02B 6/4452* (2013.01); *G02B 6/4479* (2013.01); *G02B 6/4442* (2013.01)
 USPC ........................................................ 385/135
(58) Field of Classification Search
 CPC .... G02B 6/444; G02B 6/4441; G02B 6/4442; G02B 6/4444
 USPC .......................................................... 385/135
 See application file for complete search history.

(56) References Cited

U.S. PATENT DOCUMENTS

| 6,411,767 B1 * | 6/2002 | Burrous et al. | 385/135 |
| 7,783,152 B2 | 8/2010 | Knorr et al. | 385/136 |
| 2004/0001686 A1 | 1/2004 | Smith et al. | 385/135 |
| 2007/0183732 A1 | 8/2007 | Wittmeier et al. | 385/135 |

FOREIGN PATENT DOCUMENTS

| EP | 1970737 A1 | 9/2008 | G02B 6/44 |
| EP | 2195694 B1 | 3/2012 | G02B 6/44 |
| WO | WO2007/118548 A1 | 10/2007 | H02G 15/013 |
| WO | WO2009/103443 A1 | 8/2009 | G02B 6/44 |

OTHER PUBLICATIONS

Patent Cooperation Treaty Form ISA/210, International Application No. PCT/US2013/053710, mailing date Dec. 5, 2013—3 pages.
Patent Cooperation Treaty Form ISA/237, International Application No. PCT/US2013/053710, mailing date Dec. 5, 2013—5 pages.

* cited by examiner

*Primary Examiner* — Ryan Lepisto

(57) ABSTRACT

A fiber management frame for a fiber optic closure having a removable tray holder configured to mount a fiber optic tray offset from a fiber management interface. The tray holder has optical fibers mounted thereon and can be mounted and/or removed from the fiber management interface without interfering with optical fibers mounted on the fiber management interface. The fiber management interface defines a first slack storage area for a first group of optical fibers. The removable tray holder defines a second slack storage area for a second group of optical fibers offset from the fiber management interface. The fiber optic tray can be mounted to or removed from the fiber management interface without interfering with the first group of optical fibers.

15 Claims, 15 Drawing Sheets

FIBER MANAGEMENT FRAMES HAVING MODULAR TRAY HOLDER

CROSS-REFERENCE TO RELATED APPLICATIONS

This application claims the benefit of priority under 35 U.S.C. §119 of U.S. Provisional Application No. 61/681,908 filed on Aug. 10, 2012, the content of which is relied upon and incorporated herein by reference in its entirety.

BACKGROUND

The disclosure relates generally to optical fibers and fiber optic cables, and more particularly to a fiber management frame having a modular tray holder, which may be used in managing fibers in a fiber optic closure, and related devices, systems, and methods.

Fiber optic networks typically include interconnection closures at various splice locations throughout the fiber optic networks. Interconnection closures include splice closures, patch closures, and splitter closures. Splice closures commonly house splices connecting the optical fibers of one or more distribution cables to respective optical fibers of a fiber optic feeder cable. By housing the splices, a splice closure protects the spliced end portions of the optical fibers from environmental degradation, strain, and other deleterious forces, thereby increasing the reliability and quality of the splices.

A typical butt-type splice closure includes a canister open at one end and a single end cap positioned within the open end of the canister housing. Each of the fiber optic cables associated with the butt-type splice closure extends through the single end cap. Conventional closures of the above-described types generally include a frame that is connected to the end cap(s) and carries a number of fiber optic splice trays disposed in a stacked arrangement within the canister housing.

In this regard, FIG. 1A illustrates an isometric view of a conventional optical fiber interconnection closure 10. The closure 10 includes a canister housing 12 defining an internal cavity 14 and an opening 16 to the internal cavity 14. The canister housing 12 in FIG. 1A has a cylindrical shape. The opening 16 is positioned at a front end 18 of the canister housing 12, and an opposite rear end 20 of the canister housing 12 is closed. The canister housing 12 extends in a longitudinal direction extending between the front and rear ends 18, 20. A wall of the canister housing 12 extends around and defines a housing axis $A_1$ extending between the front and rear ends 18, 20. The internal cavity 14 receives and the canister housing 12 carries a butt-type support assembly 22. The support assembly 22 holds fiber optic cables 24. Buffer tubes 26 containing optical fibers (not shown) extend from end portions of the fiber optic cables 24. The support assembly 22 supports the buffer tubes 26 and splices (not shown) that connect the optical fibers.

The support assembly 22 includes an end cap 28 and a butt-type support frame 30 connected to and extending rearward from the end cap 28. FIG. 1B also illustrates a detailed isometric view of support frame 30 of FIG. 1A. The support assembly 22 is movable between an enclosed configuration and an unenclosed configuration. The end cap 28 is positioned in the opening 16 of the canister housing 12 during the enclosed configuration. The support frame 30 and the components carried thereby are positioned within the internal cavity 14 of the canister housing 12 during the enclosed configuration. In contrast, the end cap 28 is removed from the opening 16 to provide the unenclosed configuration. Likewise, the support frame 30 and the components carried thereby, such as splice trays 32, are removed from the internal cavity 14 during the unenclosed configuration. The splice trays 32 are configured to receive bolts 34 therethrough. In this manner, the splice trays 32 and other compatible trays may be secured to the support frame 30 by the bolts 34 and wing nuts 36.

The support frame 30 is also removably mounted to the end cap 28 in a cantilever-like fashion. FIGS. 1A and 1B illustrate that the support frame 30 has a pair of cantilevered legs 38. Each pair of cantilevered legs 38 has an aperture 40 therethrough for being secured to the end cap 28 via a machine screw 42.

As can be seen from FIGS. 1A and 1B, the enclosed configuration of the end cap 28 requires all of the above described components to be tightly packed into the volume of the canister housing 12. In addition, it is also desirable in the unenclosed configuration to have convenient access to a variety of different fiber optic cables 24, buffer tubes 26, optical fibers, groups of optical fibers, splice trays 32, and/or other trays.

No admission is made that any reference cited herein constitutes prior art. Applicant reserves the right to challenge the accuracy and pertinency of any cited documents.

SUMMARY

In one embodiment, a fiber management frame for a fiber optic closure having a removable tray holder configured to mount a fiber optic tray offset from a fiber management interface is provided. The tray holder has optical fibers mounted thereon and can be mounted and/or removed from the fiber management interface without interfering with optical fibers mounted on the fiber management interface. The fiber management interface defines a first slack storage area for a first group of optical fibers. The removable tray holder defines a second slack storage area for a second group of optical fibers offset from the fiber management interface. The fiber optic tray can be mounted to or removed from the fiber management interface without interfering with the first group of optical fibers. In one non-limiting example, a fiber optic cable having a plurality of optical fibers entering the fiber optic closure can be accessed and divided into two or more groups of optical fibers, with a first group of express (i.e., pass-through) fibers disposed and secured in the first slack storage area, and a second group of cut fibers disposed in the second slack storage area. The second group of cut fibers may be spliced, split, combined, or otherwise manipulated via one or more fiber optic trays. Thus, the tray holder in this example can be mounted to or removed from the fiber management interface, along with the fiber optic tray(s) and second group of optical fibers, without interfering with the first group of optical fibers disposed and secured in the first slack storage area. This arrangement facilitates management of different groups of optical fibers within a fiber optic closure.

In one embodiment, a fiber management frame for a fiber optic closure is disclosed. The fiber management frame comprises a fiber management interface defining a first slack storage area for a first group of optical fibers. The fiber management frame also comprises a tray holder defining a second slack storage area offset from the fiber management interface for a second group of optical fibers and defining at least one tray mounting area offset from the fiber management interface. The tray holder is configured to be removably mounted to the fiber management interface without interfering with the first group of optical fibers. The tray holder is further configured to removably mount to at least one fiber optic tray in the at least one tray mounting area. This arrangement facilitates management of different groups of optical fibers within a fiber optic closure.

In another embodiment, a method of assembling a fiber management frame for a fiber optic closure comprises providing a fiber management interface defining a first slack storage area for a first group of optical fibers. The method further comprises mounting the first group of optical fibers within the first slack storage area of the fiber management interface. The method further comprises providing a tray holder defining a second slack storage area offset from the fiber management interface for a second group of optical fibers. The method further comprises mounting the tray holder to the fiber management interface without interfering with the first group of optical fibers. The method further comprises mounting at least one fiber optic tray to the tray holder such that the at least one fiber optic tray is offset from the fiber management interface.

In another embodiment, a fiber optic closure comprises an end cap configured to accommodate at least one fiber optic cable therethrough. The fiber optic closure further comprises a fiber management frame attached to the end cap. The fiber management frame comprises a fiber management interface defining a first slack storage area for a first group of optical fibers. The fiber management frame further comprises a tray holder defining a second slack storage area offset from the fiber management interface for a second group of optical fibers. The tray holder is configured to mount to at least one fiber optic tray such that the at least one fiber optic tray is offset from the fiber management interface. The tray holder is removably mounted to the fiber management interface without interfering with the first group of optical fibers. The fiber optic closure further comprises the at least one fiber optic tray removably mounted to the tray holder such that the tray holder can be removed from the fiber management interface without removing the at least one fiber optic tray from the tray holder.

Additional features and advantages will be set forth in the detailed description which follows, and in part will be readily apparent to those skilled in the art from the description or recognized by practicing the embodiments as described in the written description and claims hereof, as well as the appended drawings.

The foregoing general description and the following detailed description are merely exemplary, and are intended to provide an overview or framework to understand the nature and character of the claims. The drawings illustrate one or more embodiment(s), and together with the description serve to explain principles and operation of the various embodiments.

DETAILED DESCRIPTION

Figure 1A:
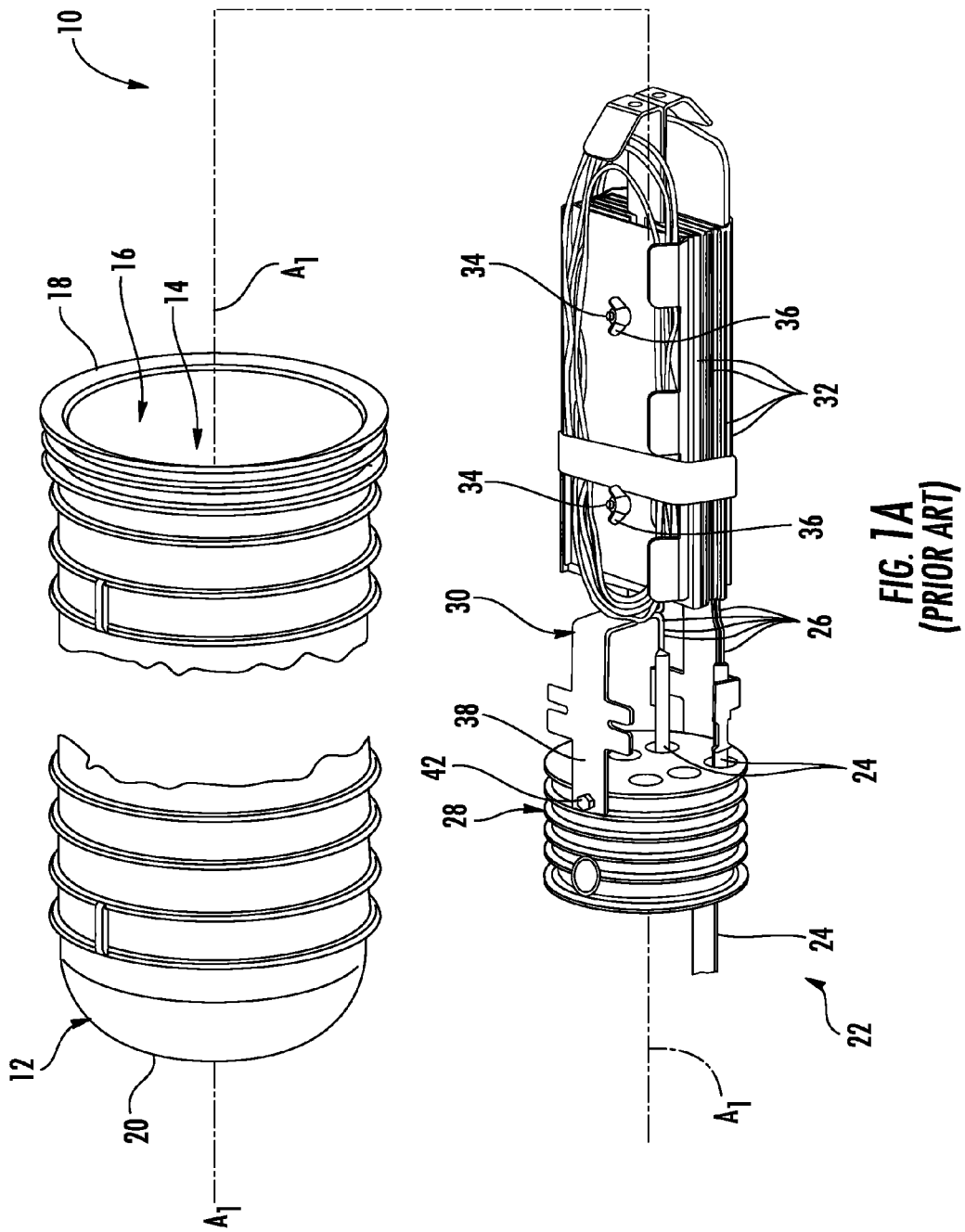
FIG. 1A is an exploded isometric view of an exemplary fiber optic closure including a support frame according to the prior art.
Figure 1B:
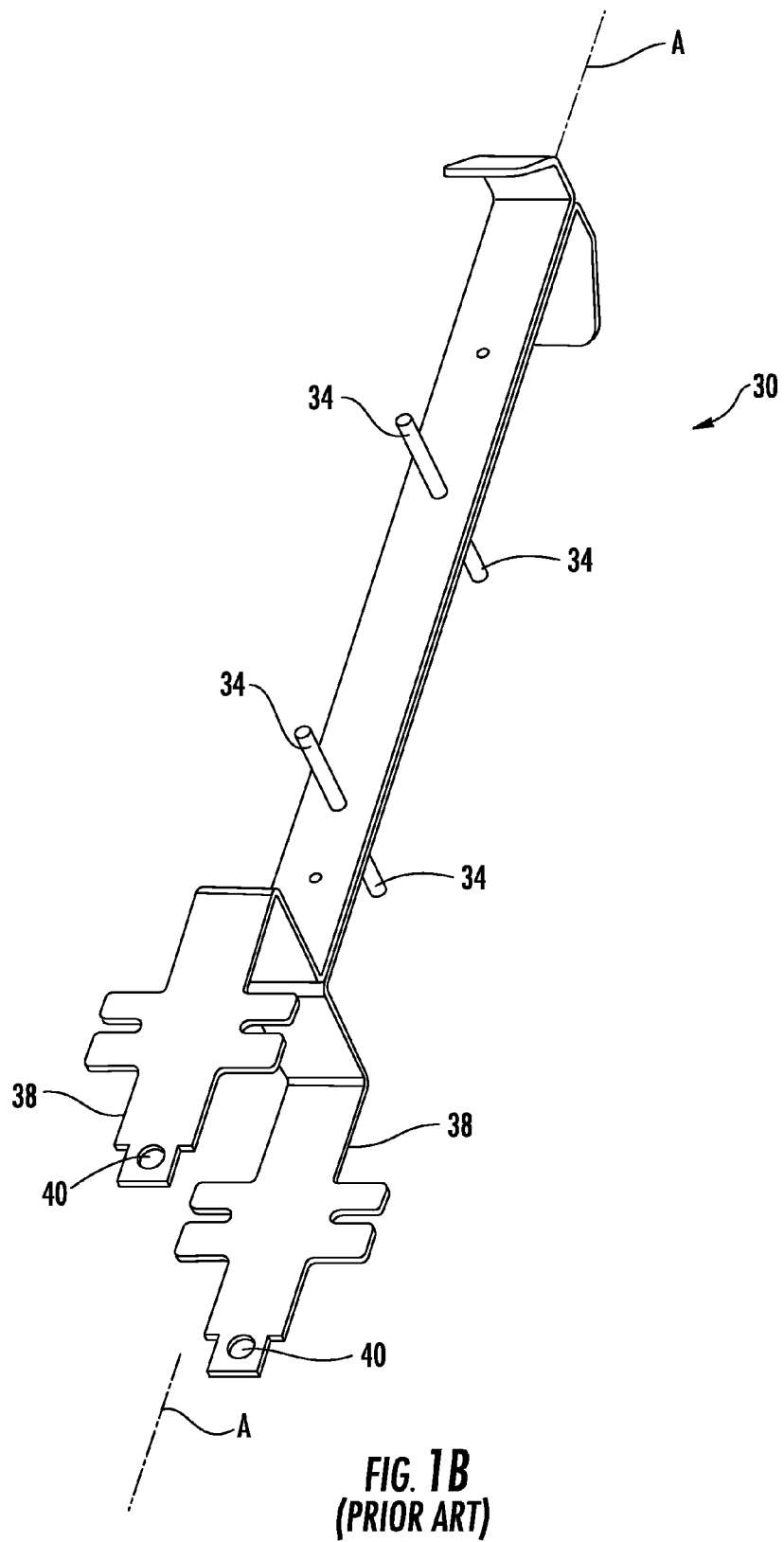
FIG. 1B is an isometric view of the support frame for the exemplary fiber optic closure of FIG. 1A according to the prior art.

As discussed above with regard to FIGS. 1A and 1B, cable management can be difficult when using conventional end cap support frames, such as the support frame 30. In particular, tightly packing a large number of components, such as the fiber optic cables 24 and the splice trays 32, can make it difficult to manage pass through (i.e. express) fibers independently of cut fibers. For example, express fibers are optical fibers that bypass the splice trays 32. Cut cables are optical fibers that may enter one or more of the splice trays 32 to be spliced, split, or otherwise manipulated before exiting the splice trays 32 and rejoining the express fibers and/or branching off into a separate fiber optic cable 24, such as a distribution or drop cable. Accordingly, there is a need for a fiber management frame that allows different groups of fibers to be managed and moved without interfering with other groups of optical fibers.

Figure 2:
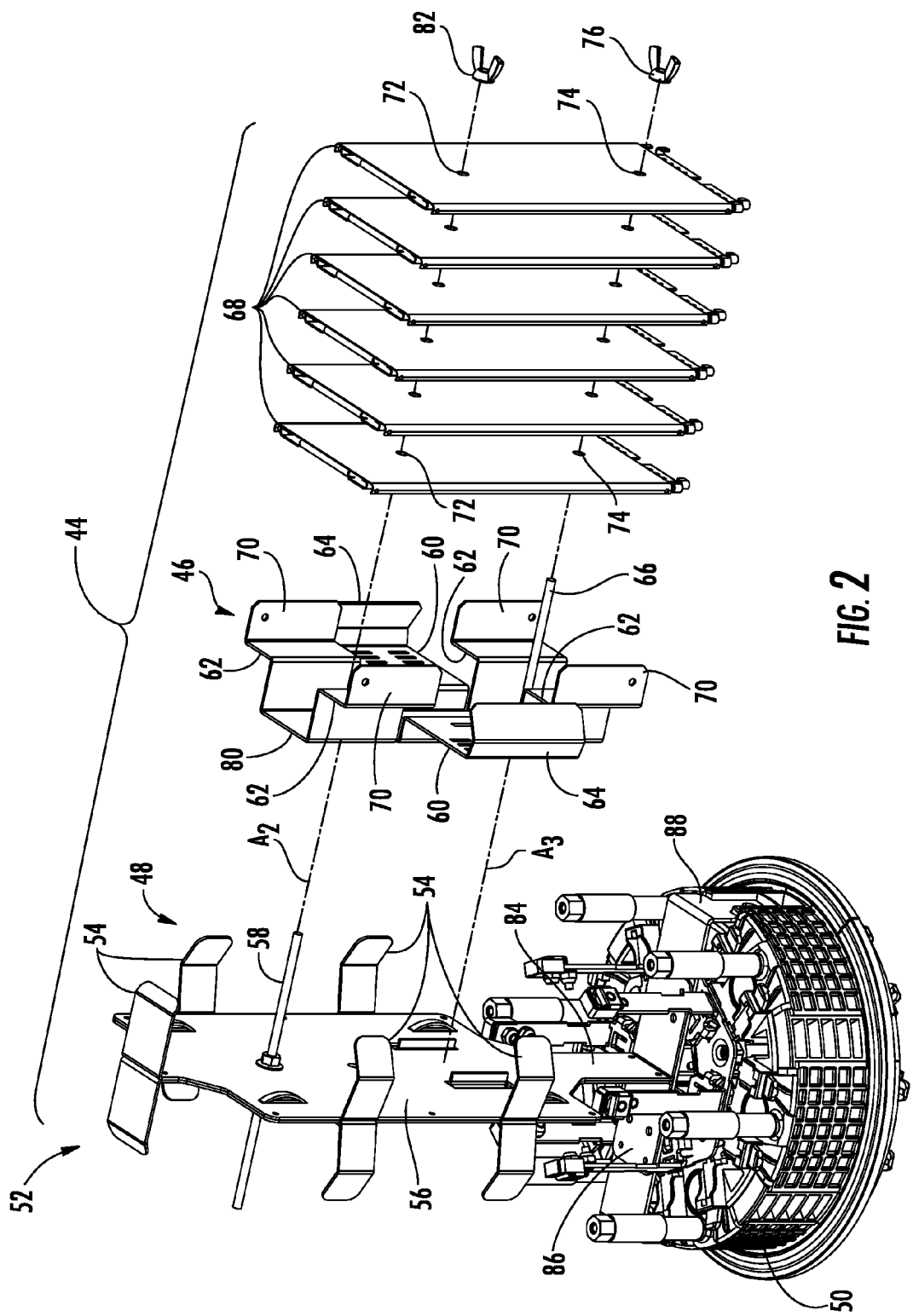
FIG. 2 illustrates an exploded isometric view of a fiber management frame and a tray holder that is mountable to the fiber management frame without interfering with optical fibers mounted to the fiber management frame, according to an exemplary embodiment.

FIG. 2 illustrates a partially exploded isometric view of a fiber management frame 44 having a mountable modular tray holder 46 that provides for fiber management of different groups of fibers without interfering with other groups of optical fibers. As used herein, the term "without interfering" refers generally to not moving or disturbing one group of optical fibers when moving or manipulating another component and/or group of optical fibers. For example, as will be described in greater detail with respect to FIGS. 4A-4D below, the fiber management frame 44 of FIG. 2 permits the tray holder 46 to be independently mounted and/or removed from a fiber management interface 48 of the fiber management frame without interfering with, moving, or otherwise disturbing optical fibers that may be mounted directly to the fiber management interface 48. Thus, the tray holder 46, which may have additional optical fibers or other components mounted thereon, can be installed and/or removed without taking apart the entire fiber management frame 44.

In FIG. 2, a fiber management interface 48 of the fiber management frame 44 is mounted to an end cap 50 of a fiber optic closure 52. The fiber management interface 48 includes a plurality of arms 54 extending from a first interface surface 56 to define a first slack storage area for mounting a group of optical fibers, for example. The fiber management interface 48 also includes a first bolt 58 extending from the first interface surface 56 along axis $A_2$ for removably mounting a tray holder 46 to the first interface surface 56.

The tray holder 46 is adapted to receive the first bolt 58 therethrough and includes a pair of primary cantilevered surfaces 60 defining a second slack storage area separate from the first slack storage area of the fiber management interface 48. The tray holder 46 further includes a tray mounting area defined by a plurality of secondary cantilevered surfaces 62 offset from the fiber management interface 48 and the primary cantilevered surfaces 60 of the tray holder 46. In this embodiment, each primary cantilevered surface 60 includes a primary cantilevered arm 64 to further define the second slack storage area of mounting another group of optical fibers.

The tray holder 46 also includes a second bolt 66 extending along axis $A_3$ parallel to the first bolt 58 of the fiber management interface 48 (extending along axis $A_2$) for removably securing one or more fiber optic trays 68 to the secondary cantilevered surfaces 62 of the tray holder 46. In this embodiment, the fiber optic trays 68 have standardized dimensions for engaging a plurality of cantilevered guide portions 70 disposed on each of the secondary cantilevered surfaces 62. Each fiber optic tray 68 also includes first and second apertures 72, 74 at standardized locations on the fiber optic tray 68. Thus, each fiber optic tray 68 can be mounted to the secondary cantilevered surfaces 62 of the tray holder 46 by extending the second bolt 66 through the second aperture 74 of each fiber optic tray 68 and secured by a fastener, such as a wing nut 76. The tray holder 46 and the fiber optic tray 68 assembly can then be mounted to the fiber management interface 48 by extending the first bolt 58 through an aperture 78 (see FIG. 6) in a second interface surface 80 (i.e., the base) of the tray holder 46 and through the first aperture 72 of each fiber optic tray 68. The tray holder 46 and the fiber optic tray 68 assembly can then be secured to the fiber management interface 48 with another fastener, such as a wing nut 82, secured to the first bolt 58. Thus, each of the fiber management interface 48, tray holder 46 and trays 68 can be removably mounted to each other without interfering with other components, such as optical fibers, mounted thereon. In this manner, individual components fiber management frame 44 can be easily removed and accessed, for example, by an installer or technician, without requiring the entire fiber management frame 44 to be dismantled.

In addition, the entire assembled fiber management frame 44 may also be installed or removed from the end cap 50 as one unit. The fiber management interface 48 includes a vertical stem 84 that extends downward towards a base 86. In this embodiment, two vertical legs 88 extend down from the base 86, and may be fastened to the end cap 50 by an appropriate fastener, such as a pair of machine screws (not shown), extending through a pair of apertures 90 (see FIG. 5) in the vertical legs 88.

Figure 3:
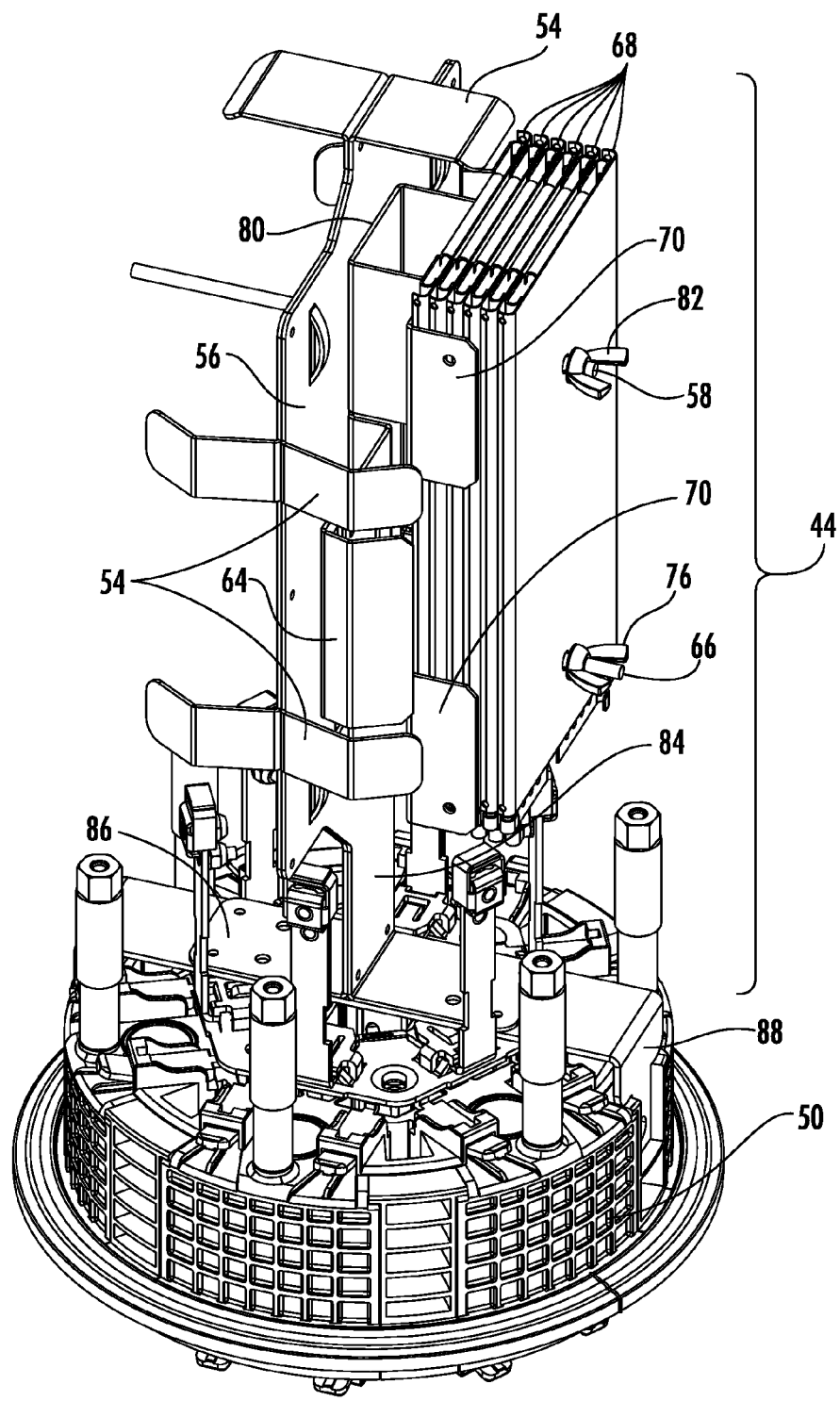
FIG. 3 illustrates an assembled isometric view of the fiber management frame and the tray holder of FIG. 2.

FIG. 3 illustrates an assembled view of the fiber management frame 44 of FIG. 2. As discussed above with respect to FIG. 2, the fiber optic tray 68 is secured to the tray holder 46 via the second bolt 66 and the wing nut 76, and can be further secured by an optional strap (not shown) and/or other fiber management accessories as desired. The tray holder 46 and the fiber optic tray 68 assembly is secured to the fiber management interface 48 by the first bolt 58 and the wing nut 82. Thus, the tray holder 46 and the fiber optic tray 68 assembly can be removed as one piece from the fiber management interface 48.

In this manner, different groups of fiber optic cables can be easily accessed without interfering with other groups of fiber optic cables mounted on different parts of the fiber management frame 44. As will be described in detail with respect to FIG. 4A-4D below, the mounting and removal of a tray holder 46 with optical fibers and other components mounted thereon does not interfere with optical fibers mounted to the first slack storage area defined by the fiber management interface 48.

Figure 4A:
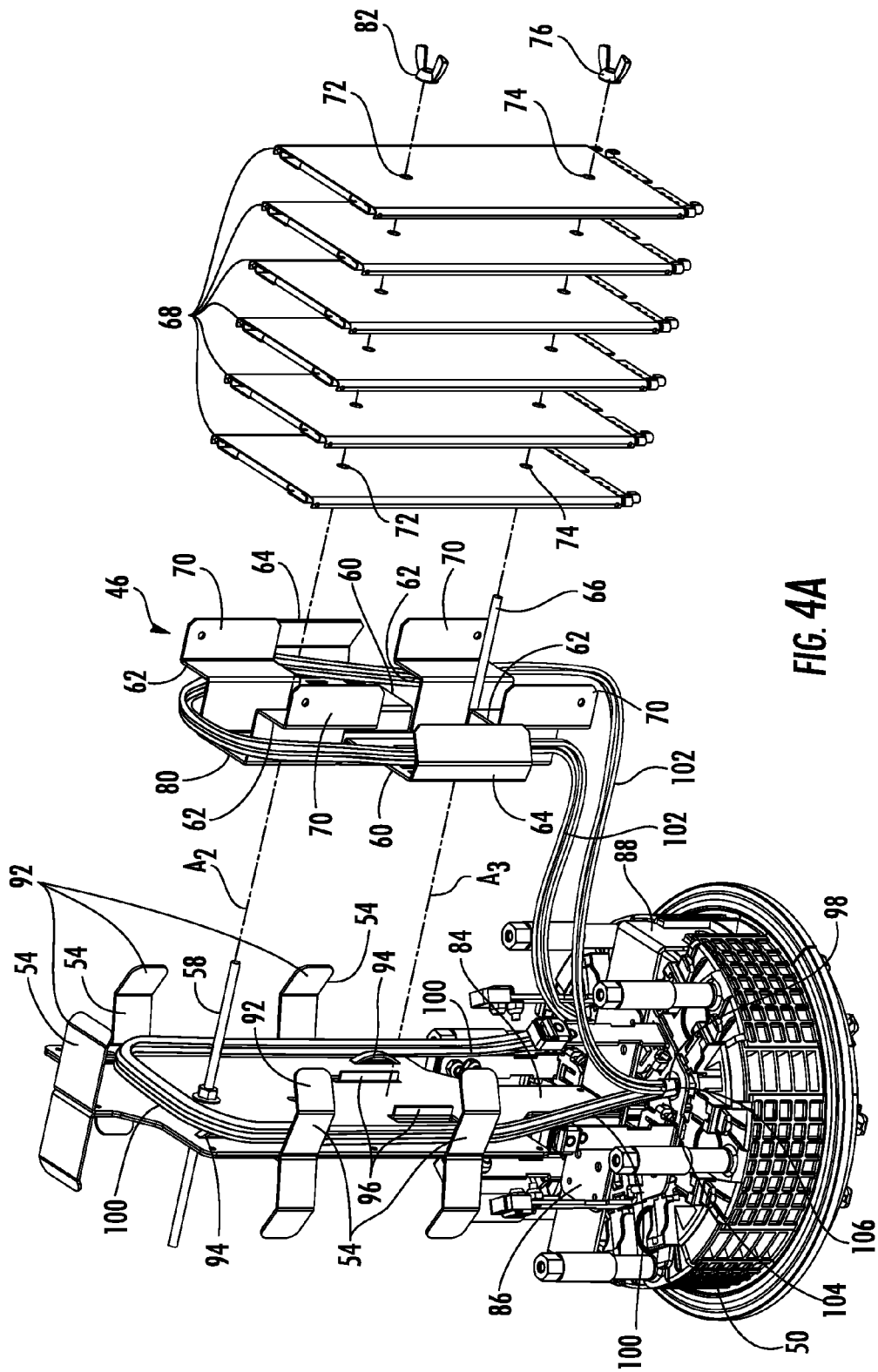
FIGS. 4A-4D illustrate a method assembling a closure assembly for fiber optic cables including the fiber management frame of FIGS. 2 and 3.

FIGS. 4A-4D illustrate an exemplary method for assembling the closure assembly of FIGS. 2 and 3 with cables mounted thereon. In this regard, FIG. 4A illustrates the fiber management interface 48 engaging to the end cap 50 via two vertical legs 88 that extend down from the base 86. The vertical legs 88 may also be fastened to the end cap 50 by a pair of machine screws (not shown) or other fasteners. The vertical stem 84 extends upward from the base 86 and supports the substantially flat first interface surface 56.

The fiber management interface 48 also includes a plurality of arms 54 extending from the first interface surface 56 to form a first slack storage area for mounting optical fibers. Each of the plurality of arms 54 contains an angled portion 92 that serves to help keep mounted optical fibers within the first slack storage area. The first interface surface 56 also includes a plurality of slits 94 for securing the optical fibers to the first interface surface 56 within the first slack storage area. The fiber management interface 48 includes the first bolt 58 extending from the first interface surface 56 for mounting the tray holder 46 to the fiber management interface 48, and a pair of guides 96 for preventing rotation of the mounted tray holder 46. The first bolt 58 in this example is substantially perpendicular to the first interface surface 56.

In this embodiment, fiber optic cable 98 having a plurality of express fibers 100 (also known as pass-through fibers) and cut fibers 102 enters the end cap 50 via one of a plurality of openings 104 in the end cap 50 and is routed toward the fiber management frame 44. A sheathing 106 of a portion of the fiber optic cable 98 may be removed, providing access to the express fibers 100 and cut fibers 102. The express fibers 100 are secured to the fiber management interface 48, for example, via the plurality of slits 94. Meanwhile, the cut fibers 102 may be manipulated without disturbing the express fibers 100.

The tray holder 46 includes the second interface surface 80 (i.e., a base) for mating with the first interface surface 56 of the fiber management interface 48. The second interface surface 80 includes an aperture 78 (see FIG. 6) for receiving the first bolt 58 therethrough. The second interface surface 80 is also sized to be prevented from rotating by the pair of guides 96 when disposed on the first interface surface 56 between the pair of guides 96. The tray holder 46 includes a pair of primary cantilevered arms 64 defining a second slack storage area for a group of optical fibers. Each of the primary cantilevered arms 64 contains an angled portion 108 that aligns with the angled portion 92 of the adjacent plurality of arms 54 of the fiber management interface 48.

The tray holder 46 further includes a plurality of secondary cantilevered surfaces 62 defining a tray mounting area offset from both the fiber management interface 48 and the primary cantilevered surfaces 60 of the tray holder 46. The tray holder 46 also includes a second bolt 66 extending from the second interface surface 80, such that the second bolt 66 is parallel to the first bolt 58 of the fiber management interface 48 when the tray holder 46 is mounted to the fiber management interface 48. Thus, one or more fiber optic trays 68 having standardized dimensions and a pair of first and second apertures 72, 74 at predetermined locations can be mounted to the tray mounting area of the tray holder 46. The cantilevered guide portions 70 on either side of the fiber optic trays 68 and the first and second bolts 58, 66 extending through the apertures 72, 74 of the fiber optic trays 68 align the fiber optic trays 68 within the tray mounting area of the tray holder 46. In another embodiment, an optional strap, such as hook and loop strap (not shown), may also provide additional optical fiber management options.

Figure 4B:
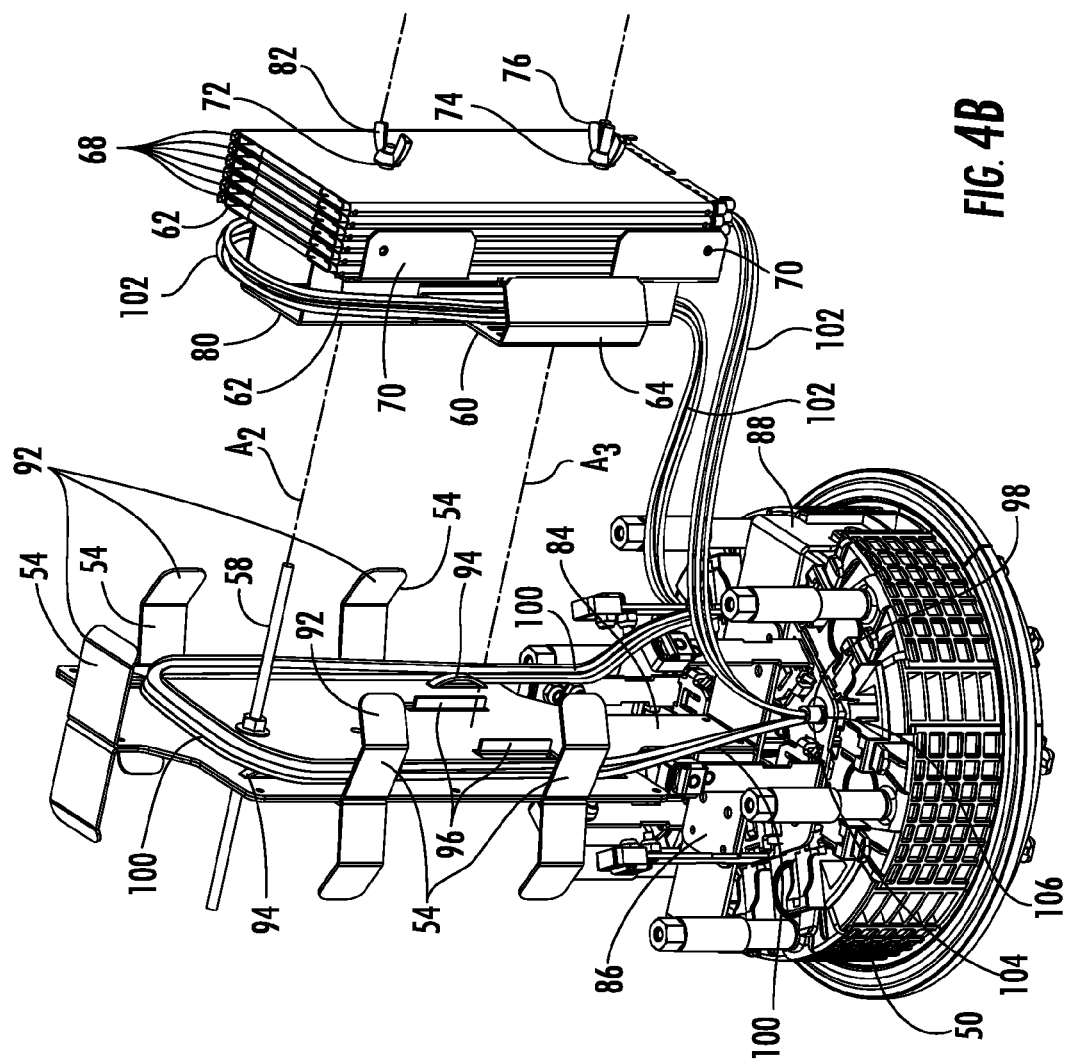

First and second fasteners, such as the wing nuts 76, 82, may be screwed onto the respective first and second bolts 58, 66 to removably secure the fiber optic trays 68, the tray holder 46, and the fiber management interface 48 to each other. As can be seen in FIG. 4B, when the wing nut 76 is removed from the first bolt 58, the tray holder 46 can be freely mounted to and removed from the fiber management interface 48 without interfering with the group of express fibers 100, which remain secured to the first interface surface 56 within the first slack storage area. Removing the tray holder 46 in this manner also does not interfere with the group of mounted cut fibers 102, which remain within the second slack storage area, or the fiber optic trays 68, which remain secured to the tray holder 46 by the second bolt 66 and the wing nut 82.

Figure 4C:
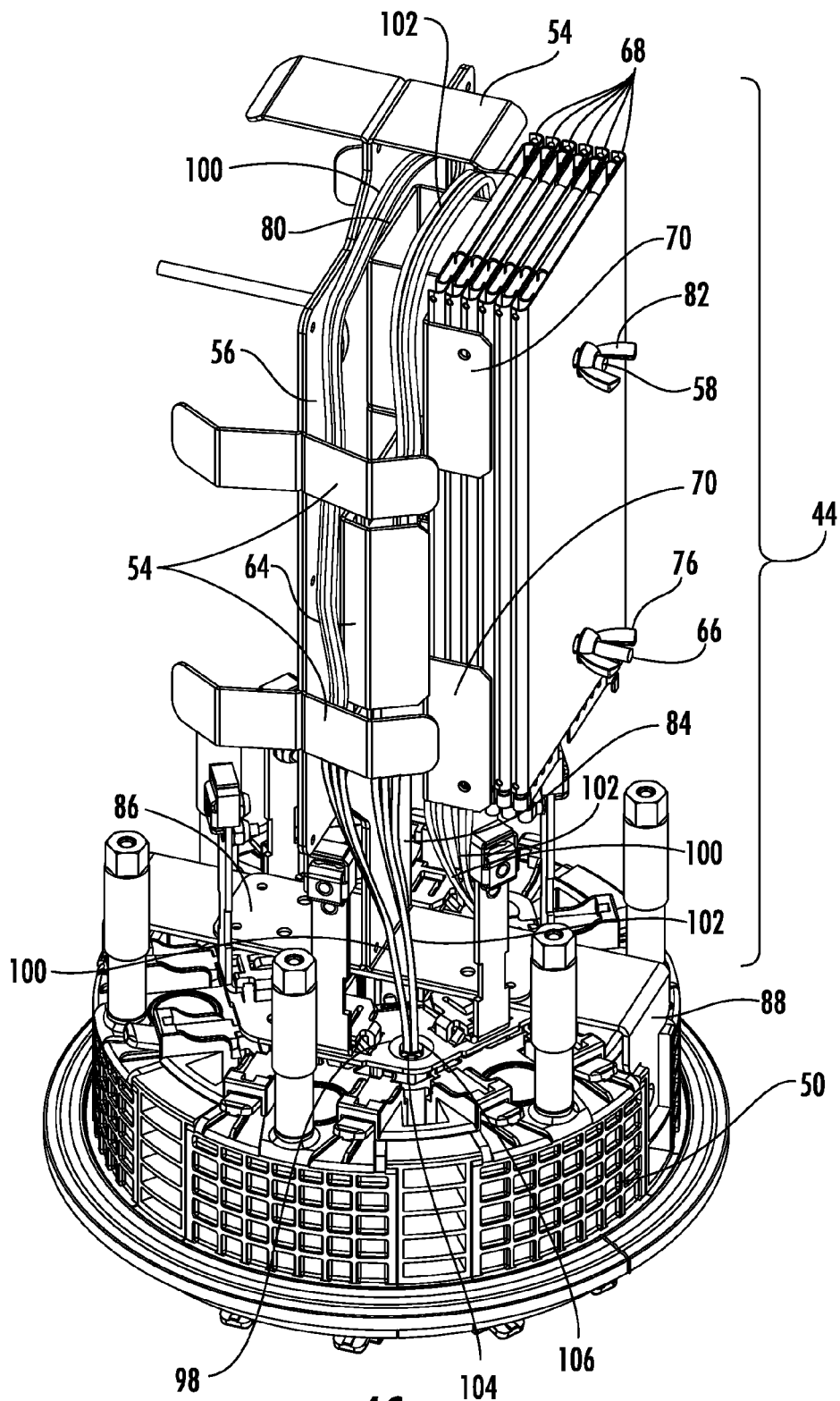
Figure 4D:
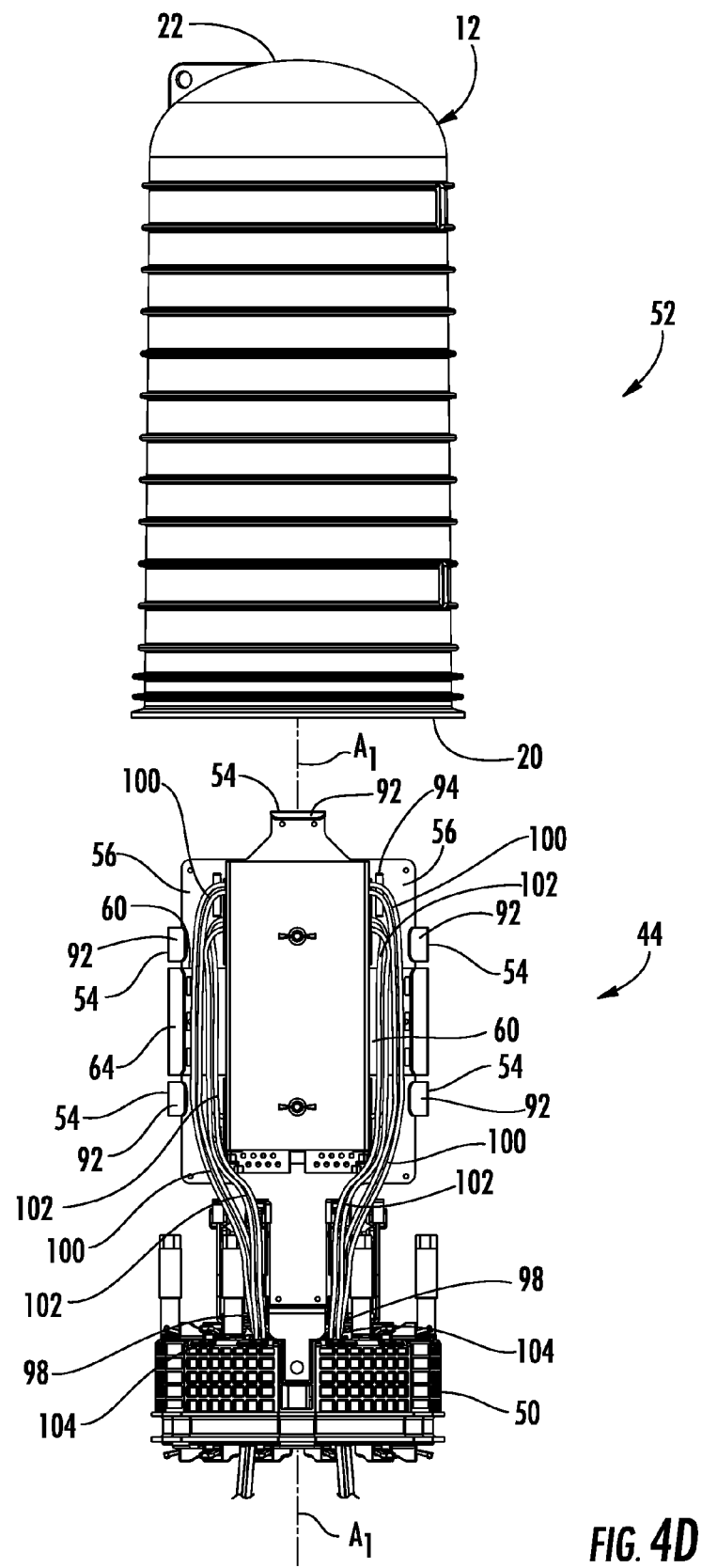

As shown in FIG. 4C, the tray holder 46 is then mounted to the fiber management interface 48 via the first bolt 58 and secured via the wing nut 76. The same type of canister housing 12 described with respect to FIG. 1A can then be installed over the fiber optic closure 52 to protect the installed components, as illustrated in FIG. 4D. In this manner, the arrangement of FIGS. 4A-4D facilitates management of different groups of optical fibers within an optical closure. As can be seen in FIGS. 4B and 4C in particular, the express and cut fibers 100, 102 of the fiber optic cable 98 are stored and organized in a compact and efficient manner, while permitting easy, non-disruptive access to different groups of optical fibers, such as the express and cut fibers 100, 102.

Figure 5:
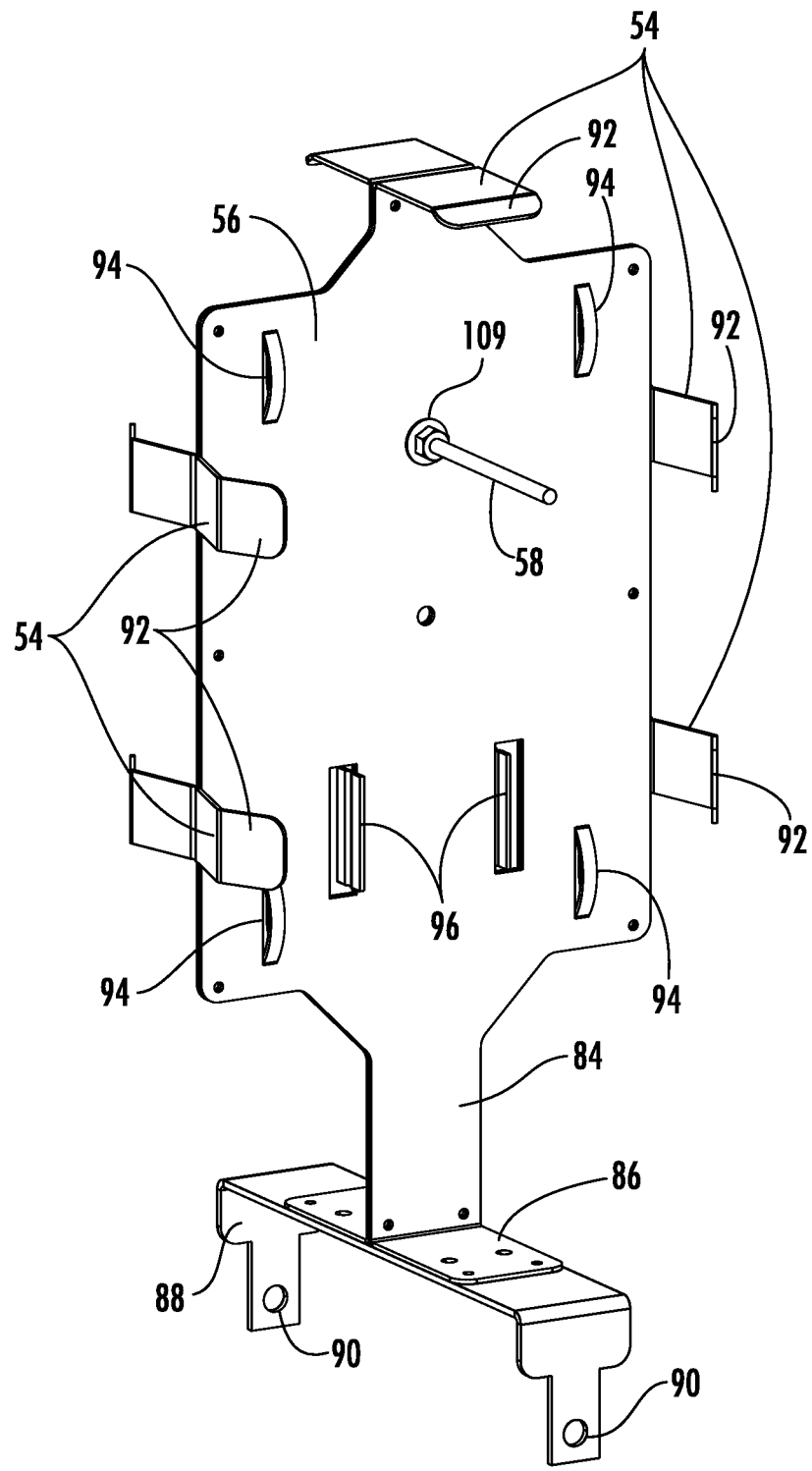
FIG. 5 illustrates a detailed isometric view of a fiber management interface of the fiber management frame of FIGS. 2, 3, and 4A-4D.

Turning now to the structural details of the individual components, FIG. 5 illustrates a detailed view of the fiber management interface 48 of the fiber management frame 44 of FIGS. 2, 3, and 4A-4D according to an exemplary embodiment. The fiber management interface 48 may be formed from a single piece of metal, or from a plurality of components. In this embodiment, the fiber management interface 48 is stamped from a single sheet of metal, with the individual arms 54, slits 94, guides 96, etc. being cut and bent into place, either manually or by machine. The first bolt 58 is mounted to the fiber management interface 48 with one or more nuts 109 or with similar fasteners. The vertical stem 84 is connected to the base 86 by one or more fasteners, or by other means, such as welding.

Figure 6:
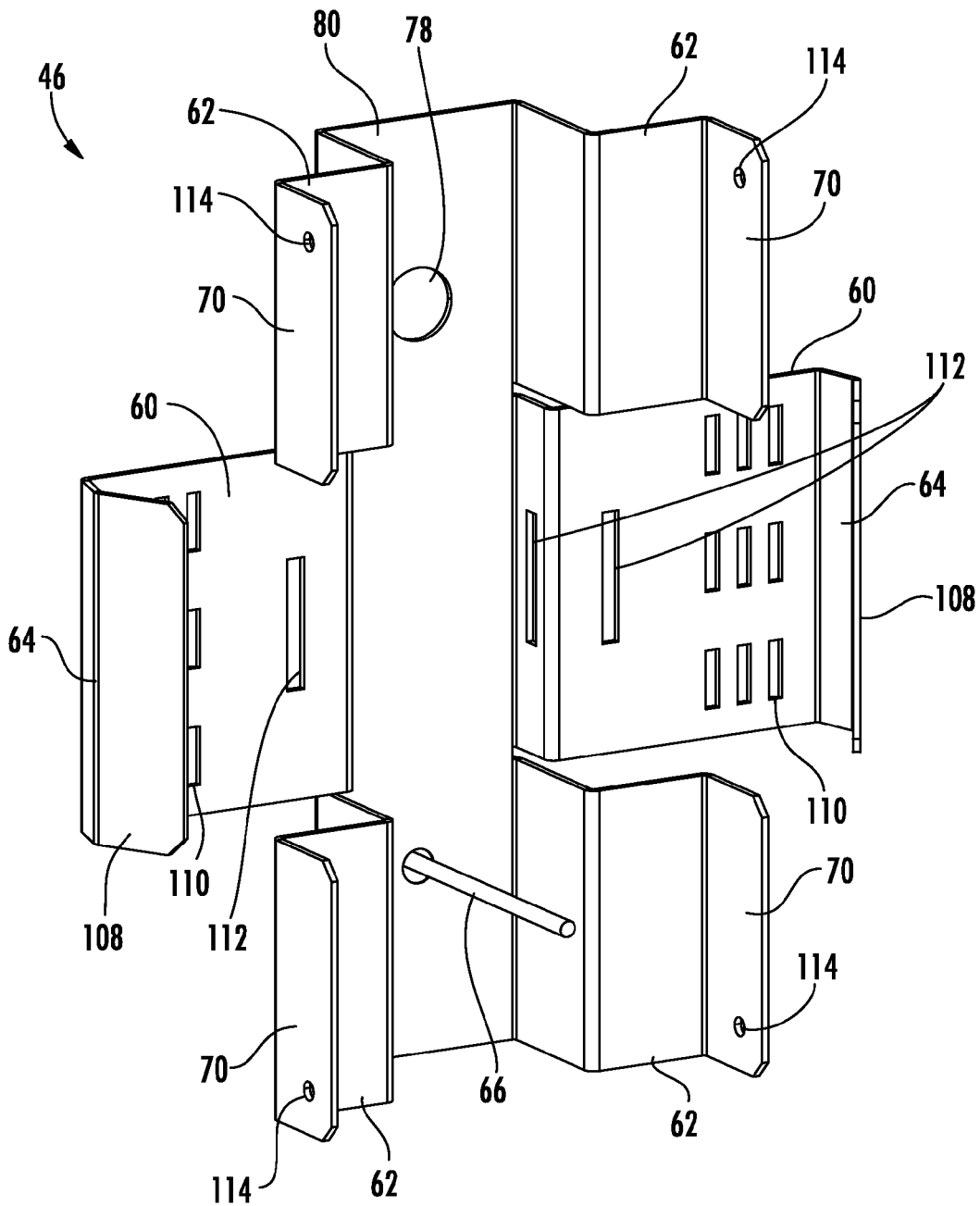
FIG. 6 illustrates a detailed isometric view of the tray holder of the fiber management frame of FIGS. 2, 3, and 4A-4D.

Similarly, FIG. 6 illustrates a detailed view of the tray holder 46 of the fiber management frame 44 of FIGS. 2, 3, and 4A-4D according to an exemplary embodiment. In this embodiment, the tray holder 46 is formed from a unitary sheet of metal that is bent into place, either manually or by machine. As discussed above, the second interface surface 80 is configured to mate with the first interface surface 56 of the fiber management interface 48. As can also be seen in this detailed view, each primary cantilevered arm 64 includes an angled portion 108 that is configured to align with corresponding angled portions 92 of the arms 54 of the fiber management interface 48 that are adjacent to the primary cantilevered arms 64. The aperture 78 and a plurality of slits 110, 112 may be cut from the unitary sheet of metal. The slits 110 are provided in this embodiment to facilitate optical fiber management within the second slack storage area, for example to hold the group of cut fibers 102 in place and to keep the group of cut fibers 102 from interfering with the fiber optic tray(s) 68. Additional, larger slits 112 may also be provided to facilitate an optional strap (not shown), for example to further secure the fiber optic trays 68 and other components to the tray holder 46.

In this embodiment, the secondary cantilevered surfaces 62 are provided. The secondary cantilevered surfaces 62 are coplanar with each other to form a tray mounting area that is parallel to and offset from the primary cantilevered surfaces 60. Each secondary cantilevered surface 62 also may include a cantilevered guide portion 70 that extends normally from an outer edge of each secondary cantilevered surface 62 to further secure and align the mounted fiber optic tray(s) 68. In this embodiment, each cantilevered guide portion 70 includes an aperture 114, which may accommodate a fastener, for example, to further secure the fiber optic tray(s) 68. It should be understood that any number or configuration of primary and secondary cantilevered surfaces 60, 62, primary cantilevered arms 64, cantilevered guide portions 70, apertures 114, or fasteners may be employed by the tray holder 46 to mount the fiber optic tray(s) 68 offset from the fiber management interface 48 when the tray holder 46 is mounted to the fiber management interface 48.

As discussed above, the fiber management frame 44 is able to compactly and efficiently arrange a large number of fiber optic cables and/or optical fibers to permit access to different groups of optical fibers without disturbing the remaining optical fibers. In addition, in some embodiments, an additional tray holder 46 can be installed on an opposite side of the fiber management interface 48. In this regard, FIGS. 7A-7D illustrate respective isometric, front, side, and top views of the assembled closure assembly of FIGS. 2, 3, and 4A-4D having a second tray holder 46 and plurality of fiber optic trays 68 on an opposite side of the fiber management interface 48 according to an exemplary embodiment.

Figure 7A:
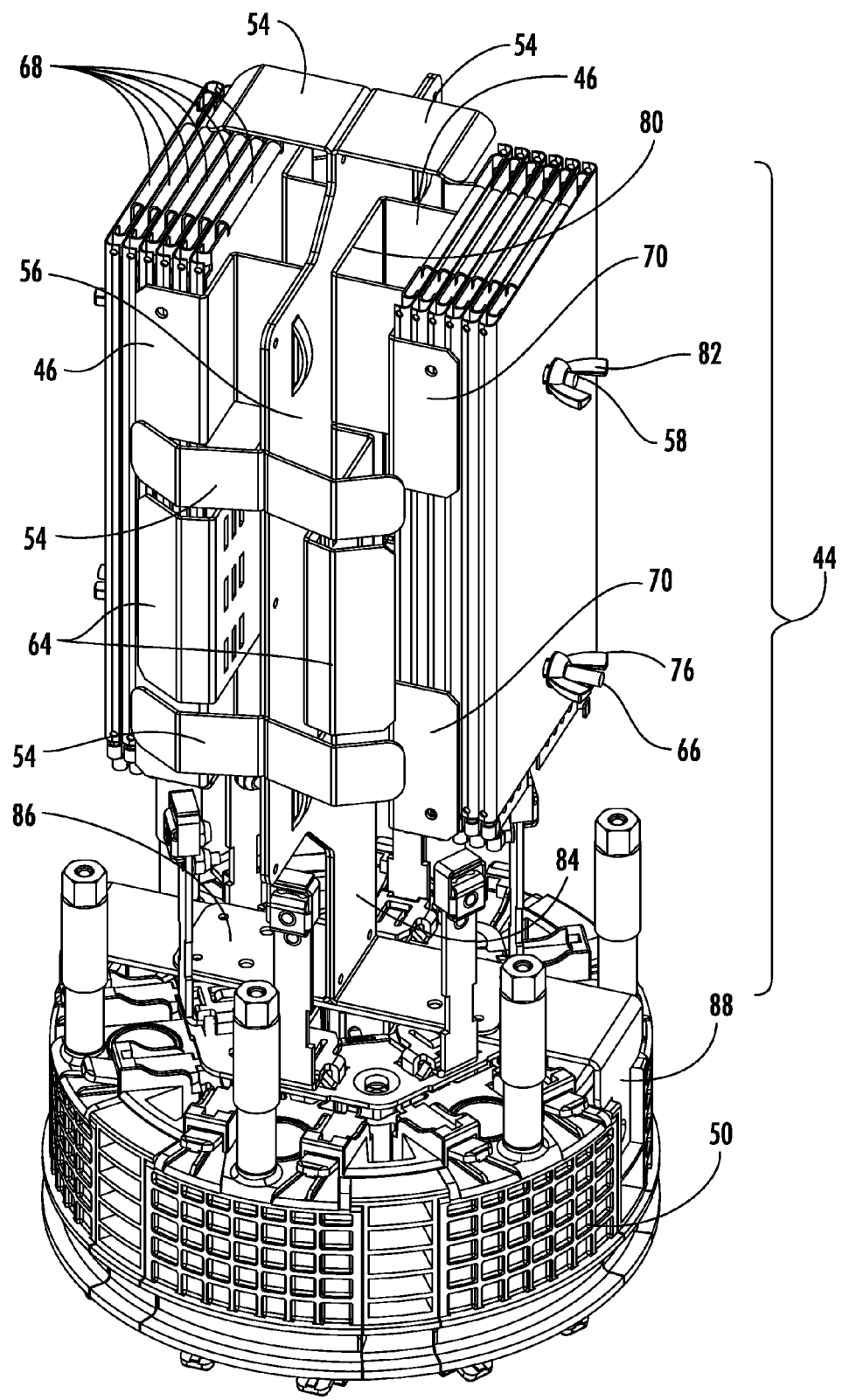
FIGS. 7A-7D illustrate respective isometric, front, side, and top views of the assembled closure assembly of FIGS. 4A-4D.

As can be seen in FIG. 7A, a second tray holder 46 with a plurality of fiber optic trays 68 mounted thereon is mounted to a third bolt 116 extending from an opposite fiber management interface 48 coaxially with the first bolt 58. In addition, a second plurality of arms 54 extends from an opposite side of the fiber management interface 48. In this embodiment, the opposite structures are symmetrical to each other, but it should be understood that the structure of the opposite side of the fiber management interface 48 could be modified or omitted as desired.

Figure 7B:
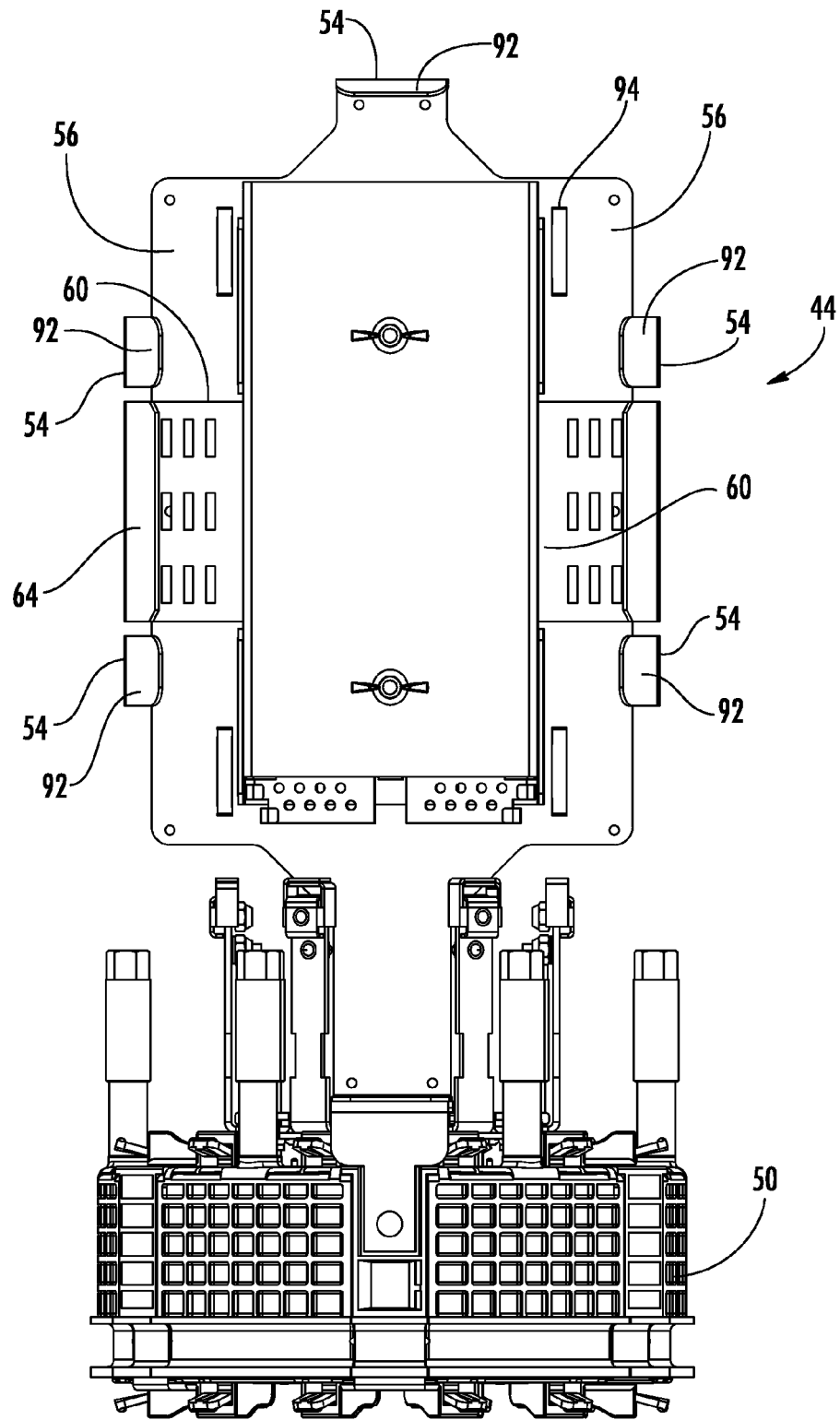
Figure 7C:
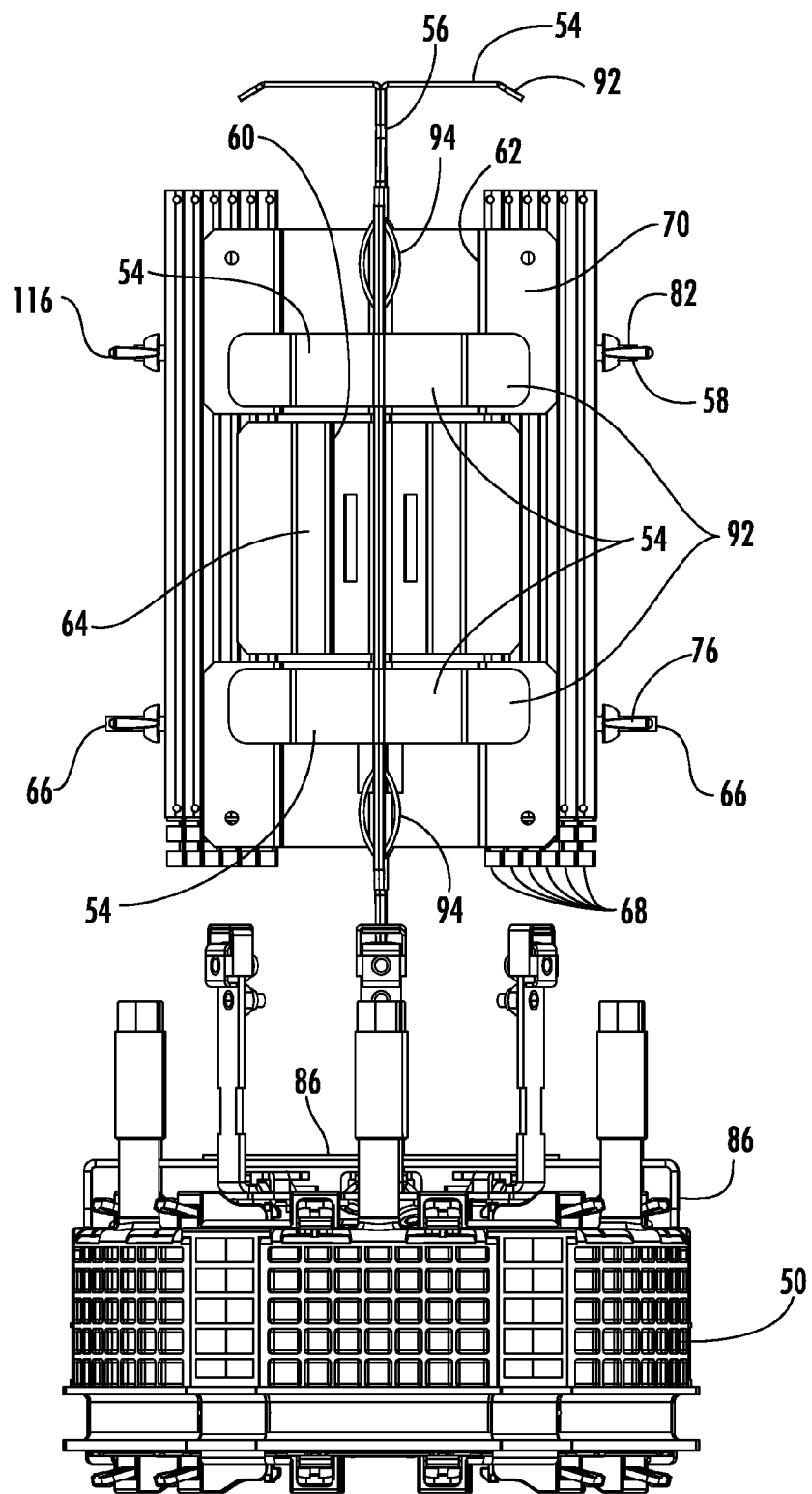
Figure 7D:
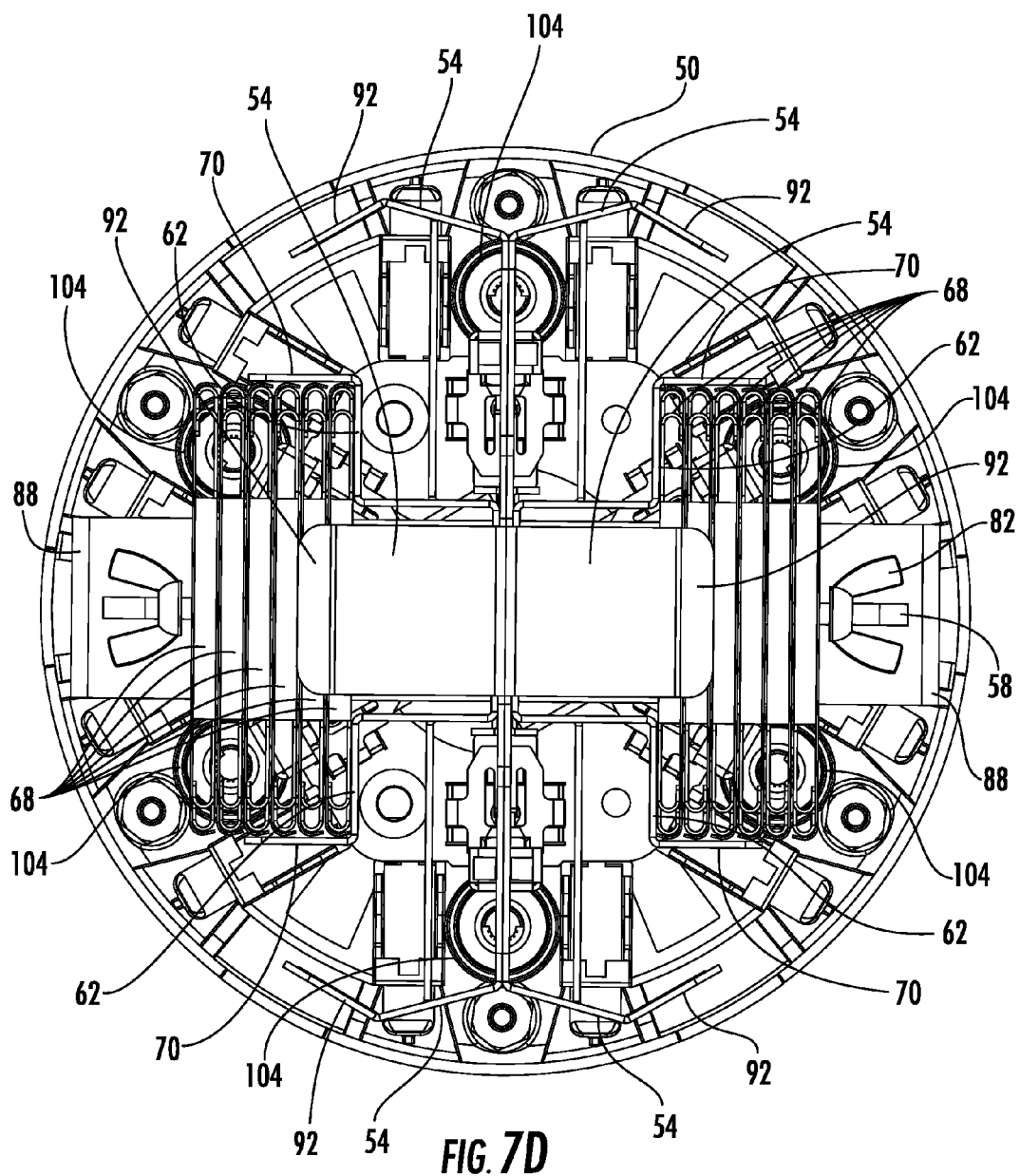

FIGS. 7B-7D illustrate the compactness of the assembled fiber management interface 48. In particular, it is apparent from FIGS. 7B-7D that the assembled fiber management interface 48 does not extend beyond an outer radius of the end cap 50 in any direction. Thus, the fiber management interface 48 can retain backwards compatibility with existing end caps 50 and the canister housing 12.

Figure 8:
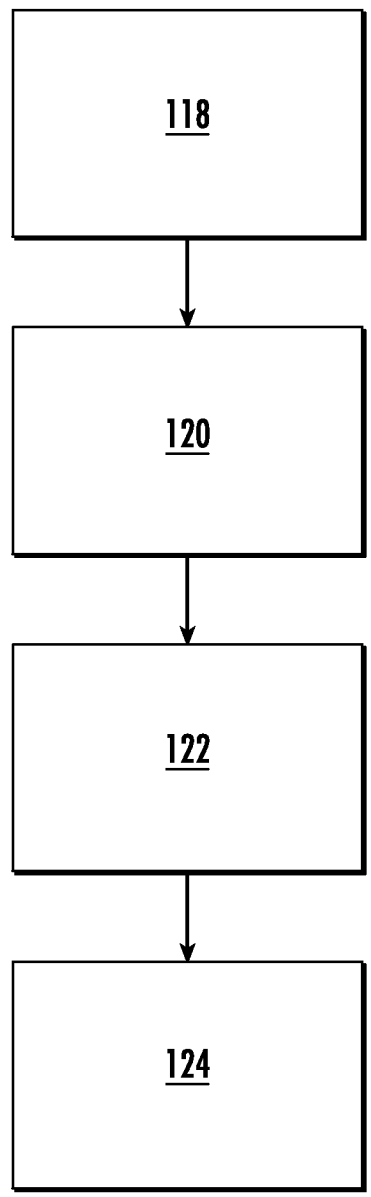
FIG. 8 illustrates a flow chart diagram of an exemplary method of assembling a closure assembly for fiber optic cables including the fiber management frame of FIGS. 2, 3, and 4A-4D.

FIG. 8 illustrates a flowchart diagram of a method of assembling a closure assembly for fiber optic cables including the fiber management frame 44 of FIGS. 2, 3, and 4A-4D. First, a fiber management interface defining a first slack storage area for a first group of optical fibers is provided (block 118). Next, a first group of optical fibers, such as express fibers, are mounted within the first slack storage area of the fiber management interface (block 120). A tray holder defining a second slack storage area offset from the fiber management interface for a second group of optical fibers is provided (block 122). The tray holder is mounted to the fiber management interface without interfering with the first group of optical fibers, such that the at least one fiber optic tray is offset from the fiber management interface (block 124).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber management frame for a fiber optic closure comprising:
   a fiber management interface including at least one first interface surface defining a first slack storage area for a first group of optical fibers; and
   a tray holder including at least one second interface surface configured to mate with the at least on first interface surface, at least one primary cantilevered surface defining a second slack storage area offset from the fiber management interface for a second group of optical fibers, and at least one secondary cantilevered surface offset from the at least one primary cantilevered surface and defining at least one tray mounting area offset from the fiber management interface,
   wherein the tray holder is configured to be removably mounted to the fiber management interface with the at least one second interface surface abutting the at least one first interface surface but without interfering with the first group of optical fibers, and the tray holder is further configured to removably mount to at least one fiber optic tray in the at least one tray mounting area.

2. The fiber management frame of claim 1, the fiber management interface including at least two fiber management arms disposed on opposing edges of the fiber management interface and generally extending in at least one direction at an angle to the at least one first interface surface.

3. The fiber management frame of claim 2, wherein each of the at least two fiber management arms generally extends in two directions at an angle to the fiber management interface.

4. The fiber management frame of claim 1, wherein the at least one primary cantilevered surface of the tray holder includes at least two cantilevered arms disposed on opposing edges of the tray holder and generally extending at an angle to the at least one second interface surface.

5. The fiber management frame of claim 1, wherein the at least one secondary cantilevered surface of the tray holder includes at least two tray mounting arms extending from the at least one second interface surface defining the at least one tray mounting surface.

6. The fiber management frame of claim 5, each of the at least two tray mounting arms comprising a guide portion extending at an angle to the at least one second interface surface.

7. The fiber management frame of claim 1, wherein the at least one second interface surface, the at least one primary cantilevered surface, and the at least one secondary cantilevered surface are all parallel to each other.

8. The fiber management frame of claim 1, wherein the at least one tray mounting area of the tray holder is offset from the at least one second interface surface of the tray holder.

9. The fiber management frame of claim 1, the fiber management interface further comprising a first bolt extending at an angle from the at least one first interface surface of the fiber management interface.

10. The fiber management frame of claim 9, the tray holder further comprising a second bolt extending at an angle from the at least one second interface surface of the tray holder such that the first bolt and the second bolt are parallel to each other when the tray holder is mounted to the fiber management interface.

11. The fiber management frame of claim 9, wherein the tray holder includes an aperture in the at least one second interface surface for receiving the first bolt of the fiber management interface therethrough when the tray holder is mounted to the fiber management interface.

12. A fiber management frame for a fiber optic closure comprising:
   a fiber management interface defining a first slack storage area for a first group of optical fibers; and
   a first tray holder defining a second slack storage area offset from the fiber management interface for a second group of optical fibers and defining at least one tray mounting area offset from the fiber management interface,
   wherein the first tray holder is configured to be removably mounted to the fiber management interface without interfering with the first group of optical fibers, and the first tray holder is further configured to removably mount to at least one fiber optic tray in the at least one tray mounting area;
   wherein the fiber management interface defining a third slack storage area for a third group of optical fibers opposite the first slack storage area, the fiber management frame further comprising a second tray holder defining a fourth slack storage area offset from the fiber management interface for a fourth group of optical fibers and defining at least one second tray mounting area offset from the fiber management interface;
   wherein the second tray holder is configured to be removably mounted to the fiber management interface without interfering with the first or third group of optical fibers and is further configured to removably mount to at least one fiber optic tray in the at least one second tray mounting area.

13. A fiber optic closure comprising:
   an end cap configured to accommodate at least one fiber optic cable therethrough; and
   a fiber management frame attached to the end cap comprising:
     a fiber management interface including at least one first interface surface defining a first slack storage area for a first group of optical fibers; and
     a tray holder including at least one second interface surface configured to mate with the at least on first interface surface, at least one primary cantilevered surface defining a second slack storage area offset from the fiber management interface for a second group of optical fibers; and at least one secondary cantilevered surface offset from the at least one primary cantilevered surface and defining at least one tray mounting area offset from the fiber management interface; and
   at least one fiber optic tray removably mounted to the tray holder such that the at least one fiber optic tray is offset from the fiber management interface;
   wherein the tray holder is removably mounted to the fiber management interface with the at least one second interface surface abutting the at least one first interface surface but without interfering with the first group of optical fibers; and
   wherein the tray holder can be removed from the fiber management interface without removing the at least one fiber optic tray from the tray holder.

14. The fiber optic closure of claim 13, further comprising a housing for mating with the end cap to define an enclosed volume such that the fiber management frame and the at least one fiber optic tray are entirely contained within the enclosed volume.

15. The fiber optic closure of claim 13, further comprising:
a first bolt extending through the tray holder and the at least one fiber optic tray at an angle from the at least one first interface surface of the fiber management interface; and
a second bolt extending from the at least one tray mounting surface of the tray holder through the at least one fiber optic tray such that the tray holder and the at least one fiber optic tray can be removed from the first bolt of the fiber management interface without removing the at least one fiber optic tray from the second bolt of the at least one fiber optic tray.

\* \* \* \* \*